United States Patent [19]

Takasuka et al.

[11] Patent Number: 5,735,224
[45] Date of Patent: Apr. 7, 1998

[54] THERMAL DECHLORINATING APPARATUS AND METHOD FOR COLLECTED ASH

[75] Inventors: Gentaro Takasuka; Mazumi Itaya, both of Ichihara, Japan

[73] Assignee: Mitsui Engineering & Shipbuilding Co., Ltd., Tokyo, Japan

[21] Appl. No.: 591,539

[22] PCT Filed: May 6, 1995

[86] PCT No.: PCT/JP95/01099

§ 371 Date: Apr. 10, 1996

§ 102(e) Date: Apr. 10, 1996

[87] PCT Pub. No.: WO95/33585

PCT Pub. Date: Dec. 14, 1995

[30] Foreign Application Priority Data

Jun. 6, 1994 [JP] Japan ................. 6-124002

[51] Int. Cl.⁶ ............................................. F23G 5/00
[52] U.S. Cl. ..................... 110/259; 110/165 R; 110/255; 110/257; 110/258
[58] Field of Search ................. 110/165 R, 251, 110/255, 257, 258, 259

[56] References Cited

U.S. PATENT DOCUMENTS

| | | | |
|---|---|---|---|
| 999,698 | 8/1911 | Chapman | 110/165 R |
| 3,916,807 | 11/1975 | Eiki | 110/14 |
| 4,105,397 | 8/1978 | Jasper et al. | 432/90 |
| 4,255,129 | 3/1981 | Reed et al. | 432/13 |
| 4,306,506 | 12/1981 | Rotter | 110/229 |

*Primary Examiner*—Ira S. Lazarus
*Assistant Examiner*—Nhat-Hang H. Lam
*Attorney, Agent, or Firm*—Fay, Sharpe, Beall, Fagan, Minnich & McKee

[57] ABSTRACT

A thermal dechlorinating apparatus for collected ash, having a vertically elongated cylindrical apparatus body, a collected ash inlet and a collected ash outlet which are provided on the apparatus body and spaced in a vertical direction thereof, an inlet port for heated air provided on the portion of the apparatus body between the inlet and the outlet, an exhaust gas outlet provided on the portion of the apparatus body above the collected ash inlet, a rotary shaft provided along the axial direction of the apparatus body, a screw provided on the rotary shaft, and heating means provided on the portion of the apparatus body between the collected ash inlet and the collected ash outlet. Heated air is led into the apparatus body through the heated air inlet port. A stirred fluidized layer is formed in the portion of the apparatus body above the heated air inlet port, and a moving layer is formed below the heated air inlet port. Combustibles in the collected ash are burned in the stirred fluidized layer, and partial or entire decomposition and removal of chlorine compounds are performed in the moving layer using the combustion heat generated by burning the combustibles.

13 Claims, 2 Drawing Sheets

THERMAL DECHLORINATING APPARATUS AND METHOD FOR COLLECTED ASH

FIELD OF THE INVENTION

The present invention relates to a thermal dechlorinating apparatus and method for collected ash, and particularly to a thermal dechlorinating apparatus and method for decomposing and removing harmful chlorine compounds contained in ash which is collected from a treatment apparatus or the like for treating exhaust gas released from waste incineration facilities for burning municipal waste and industrial waste.

BACKGROUND OF THE INVENTION

Organic chlorine compounds are contained in collected ash which is ejected from dust removing apparatus including electrostatic precipitators (EPs) and bag filters (BFs) installed in waste incineration facilities. Of these organic chlorine compounds, aromatic chlorine compounds such as polychlorinated dibenzodioxin (PCDD) and polychlorinated dibenzofuran (PCDF) are of particular interest because of their high toxicity. Thus, the development of an apparatus for treating them is desired.

An apparatus for reducing organic chlorine compounds in collected ash ejected from waste incineration facilities exists, for example, in the form of a horizontal thermal dechlorinating apparatus for collected ash provided with a rotary screw shaft.

FIG. 2 is a view illustrating a conventional thermal dechlorinating apparatus for collected ash. The apparatus comprises a horizontally elongated apparatus body 51, a feed port 52 for collected ash A and a discharge port 53 for treated ash B which are provided on the apparatus body 51 and spaced in an axial direction thereof, a rotary shaft 56 provided in the apparatus body 51, a feeding-portion screw 54, an ejecting-portion screw 55 and rotary vanes 57 fixed on the rotary shaft 56, and band heaters 58 disposed on the surface of the apparatus body 51. The collected ash A to be treated is charged into the apparatus body 51 through the feed port 52 and moves toward the discharge port 53 under action of the feeding-portion screw 54 of the rotary shaft 56. During this movement, the collected ash A is stirred and mixed by stirring vanes 57 and heated by the band heaters 58 to a temperature of 400° C., for example. Thus, organic chlorine compounds contained in the collected ash A decompose. The collected ash A from which organic chlorine compounds have been removed by decomposition, i.e. the treated ash B, is ejected from a system through the discharge port 53.

However, it is difficult for the prior art apparatus described above to be run so as to always maintain the filling rate of ash therein at high levels. When the filling rate drops, air blows through the apparatus, or part of the fed ash is ejected in a short time in an insufficiently heated state, thus causing a problem of deterioration in the efficiency of treatment. Also, combustibles remaining in the ash cannot be burned completely; hence, when collected ash containing an adsorbent such as activated charcoal or the like is treated, there arises a problem that combustibles remain in the treated ash.

SUMMARY OF THE INVENTION

An object of the present invention is to provide a thermal dechlorinating apparatus and method for collected ash which solves the aforesaid problems involved in the prior art and which has a high filling rate of ash to be treated and is capable of efficiently performing both complete combustion of combustibles remaining in the ash and decomposition of chlorine compounds.

To attain the aforesaid objective, the present invention provides the following:

(1) A thermal dechlorinating apparatus for collected ash, comprising a vertically elongated cylindrical apparatus body, a collected ash inlet and a collected ash outlet which are provided on the apparatus body spaced in a vertical direction thereof, an inlet port for heated air provided on the portion of the apparatus body between the collected ash inlet and the collected ash outlet, an exhaust gas outlet provided on the portion of the apparatus body above the collected ash inlet, a rotary shaft provided along the axial direction of the apparatus body, a screw provided on the rotary shaft, and heating means provided on the portion of the apparatus body between the collected ash inlet and the collected ash outlet.

(2) A thermal dechlorinating apparatus for collected ash as described above in (1), wherein the screw is a ribbon screw which gives an upward component force under regular rotation and which gives a downward component force under reverse rotation.

(3) A thermal dechlorinating apparatus for collected ash as described above in (1) or (2), wherein the heating means is such that a heating medium flows through a hollow rotary shaft.

(4) A thermal dechlorinating apparatus for collected ash as described above in (1), (2) or (3), wherein a cooling means for cooling ash is provided at the collected ash outlet.

(5) A thermal dechlorinating method for collected ash, wherein the collected ash is charged into a vertically elongated cylindrical apparatus body through an inlet located at the upper portion of the apparatus body, the collected ash being stirred and mixed with a rotary screw provided along the axial direction of the apparatus body and heated by heating means provided on at least one of the apparatus body and the rotary screw to thereby decompose and remove chlorine compounds contained therein, the treated collected ash being ejected from the lower portion of the apparatus body, gas produced by the decomposition being released from an exhaust port provided on the portion of the apparatus body above the collected ash inlet, Wherein heated air is led into the portion of the apparatus body between the collected ash inlet and a collected ash outlet, a stirred fluidized layer being formed in the portion of the apparatus body above the portion for leading the heated air in and a moving layer being formed in the portion of the apparatus body below the portion for leading the heated air in, combustibles in the collected ash being burned in the stirred fluidized layer, the combustion heat generated by burning the combustibles being used to perform a partial or entire decomposition and removal of the chlorine compounds.

(6) A thermal dechlorinating method for collected ash as described above in (5), wherein the rotary screw is a ribbon screw which gives an upward component force under regular rotation and which gives a downward component force under reverse rotation and wherein the ribbon screw is rotated in reverse as needed.

(7) A thermal dechlorinating method for collected ash as described above in (5) or (6), wherein powder fuel of 0.1 to 10 weight percent is added to collected ash to be treated, and then the collected ash is charged into the apparatus body through the collected ash inlet.

(8) A thermal dechlorinating method for collected ash as described above in (7), wherein activated charcoal or pulverized coal is used as the powder fuel.

(9) A thermal dechlorinating method for collected ash as described above in (5), (6) or (7), wherein the collected ash from which chlorine compounds have been removed by decomposition is cooled and then ejected from the collected ash outlet.

The apparatus body has a vertically elongated cylindrical shape. The collected ash inlet and the collected ash outlet are provided on the apparatus body spaced in a vertical direction thereof. The inlet port for heated air is provided on the portion of the apparatus body between the collected ash inlet and the collected ash outlet. The rotary screw is provided along the axial direction of the apparatus body. Furthermore, the heating means is provided on the portion of the apparatus body between the collected ash inlet and the collected ash outlet. Thus, the stirred fluidized layer is formed in the portion of the apparatus body above the heated air inlet port, whereby the heated air does not blow through, in contrast to a conventional horizontal apparatus. This accelerates the contact and the stirring between the heated air and the collected ash, allows combustibles in the collected ash to burn completely, and allows the ash to be uniformly heated. On the other hand, the portion of the apparatus body below the heated air inlet port is further heated by combustion heat generated by burning the combustibles or by the heating means. Also, in the portion of the apparatus body below the heated air inlet port, the moving layer in a low-oxygen concentration, high-temperature atmosphere is formed, the low-oxygen concentration being established as a result of oxygen being consumed by the burning of the combustibles. In the moving layer, organic chlorine compounds in the collected ash are further decomposed and removed. When organic chlorine compounds are decomposed and removed sufficiently by the combustion heat generated by burning the combustibles, heating by the heater is not necessary.

In the present invention, the screw mounted on the rotary shaft provided along the axial direction of the apparatus body is preferably a single-shaft ribbon screw which acts so as to lift the collected ash upward under regular rotation and which acts so as to feed the collected ash downward under reverse rotation. Thus, during normal operation, the screw is rotated in the regular direction, so that the downward dropping of the collected ash due to gravity interacts with the lifting of the ash due to the rotation of the screw, whereby the stirring and mixing effect improves. Also, by rotating the screw in reverse as needed, a trouble such as rotating of the blocked ash together with screws or the like caused by adhesion or hardening or the like of the ash can be prevented.

In the present invention, an applicable heating means for the apparatus body comprises, for example, electric heaters which are disposed, for example, on the external surface of the apparatus body. A hollow rotary shaft may also be used to allow heating medium to flow therethrough. Also, for example, heat in an exhaust gas or the like from another apparatus may be used as a heating source.

For example, since a large amount of combustibles is contained in the collected ash which is generated in a treatment process for feeding activated charcoal to the upstream side of a bag filter in combustion exhaust gas treatment facilities, the collected ash is particularly suited for being used as the collected ash to be treated according to the present invention. In this case, by detecting the oxygen concentration of the exhaust gas, the quantity of combustible activated charcoal in the collected ash can be estimated.

In the present invention, preferably, a small amount of powdered fuel such as activated charcoal, pulverized coal, or the like is previously added to the collected ash to be treated. The amount of powdered fuel added is 0.1 to 10 weight percent of the collected ash to be treated, and preferably 0.5 to 3 weight percent. If the amount is smaller than 0.1 weight percent, the heat of combustion becomes smaller, and hence heating by the heating means becomes necessary. On the other hand, if the amount exceeds 10 weight percent, complete combustion in the apparatus is hard to achieve, and consequently combustibles remain in treated ash. When the amount of powdered fuel which is added falls within a range of 0.5 to 3 weight percent, it is not necessary to run the heating means, and the ash to be treated can be sufficiently heated only by combustion heat generated by burning the added powdered fuel. Also, in this case, combustibles hardly remain.

According to Claim 1 of the present application, the apparatus body is vertically elongated, the collected ash inlet and the collected ash outlet are provided on the apparatus body and are spaced in the vertical direction, and the inlet port for heated air is provided on the portion of the apparatus body between the ash inlet and the ash outlet. Thus, the stirred fluidized layer where combustibles burn can be formed in the portion of the apparatus body above the heated air inlet port, and the moving layer where chlorine compounds are decomposed and removed can be formed in the portion of the apparatus body below the heated air inlet port. Accordingly, combustibles in the collected ash burn completely, and organic chlorine compounds can be effectively decomposed and removed.

According to Claim 2 of the present application, the screw is a ribbon screw which gives an upward component force under regular rotation and which gives a downward component force under reverse rotation. Accordingly, in addition to the aforesaid effect associated with Claim 1, by rotating the ribbon screw in reverse as needed, the adhesion or hardening of the ash caused by condensation of water vapor and a resultant blocking trouble within the apparatus body can be prevented.

According to Claim 3 of the present application, the heating means is such that heating medium flows through the hollow rotary shaft. Accordingly, in addition to the aforesaid effects associated with Claim 1 or 2, the ash to be treated can be heated from inside the apparatus body, whereby heat loss due to radiation becomes smaller with a resultant improvement in thermal efficiency.

According to Claim 4 of the present application, cooling means for cooling ash is provided at the collected ash outlet. Accordingly, in addition to the aforesaid effects associated with Claim 1, 2 or 3, it is possible to prevent once decomposed chlorine compounds from re-synthesizing in the ash to be treated.

According to Claim 5 of the present application, the heated air is led into the portion of the apparatus body between the collected ash inlet and the collected ash outlet, whereby the stirred fluidized layer is formed in the portion of the apparatus body above the portion for leading the heated air in and the moving layer is formed in the portion of the apparatus body below the portion for leading the heated air in. Accordingly, combustibles in the collected ash can be burned in the stirred fluidized layer, and harmful chlorine compounds can be efficiently decomposed and removed in the high-temperature, low-oxygen concentration moving layer.

According to Claim 6 of the present application, the screw used is a ribbon screw which gives an upward component force under regular rotation and which gives a downward component force under reverse rotation. Accordingly, in addition to the aforesaid effects associated with Claim 5, a trouble like rotating of the ash together with the screw caused by adhesion or hardening of the ash can be prevented.

According to Claim 7 of the present application, powdered fuel is added to the collected ash to be treated. Thus, in addition to the aforesaid effect associated with Claim 5 or 6, the combustion heat generated by burning the powdered fuel is efficiently utilized in heating the ash, whereby the apparatus body becomes compact and the energy consumption of the heating means can be reduced.

According to Claim 8 of the present application, activated charcoal or pulverized coal is used as the powdered fuel. Thus, the combustion heat generated by burning it is utilized in heating the ash to be treated, whereby the energy consumption of the heating means can be reduced.

According to Claim 9 of the present application, the heated, dechlorinated collected ash is cooled and then ejected from the discharge port. Therefore, in addition to the aforesaid effects associated with Claims 5 to 7, it is possible to prevent once decomposed chlorine compounds from re-synthesizing in the ash to be treated.

BEST MODE FOR CARRYING OUT THE INVENTION

The present invention will now be described in detail by way of example.

Figure 1:
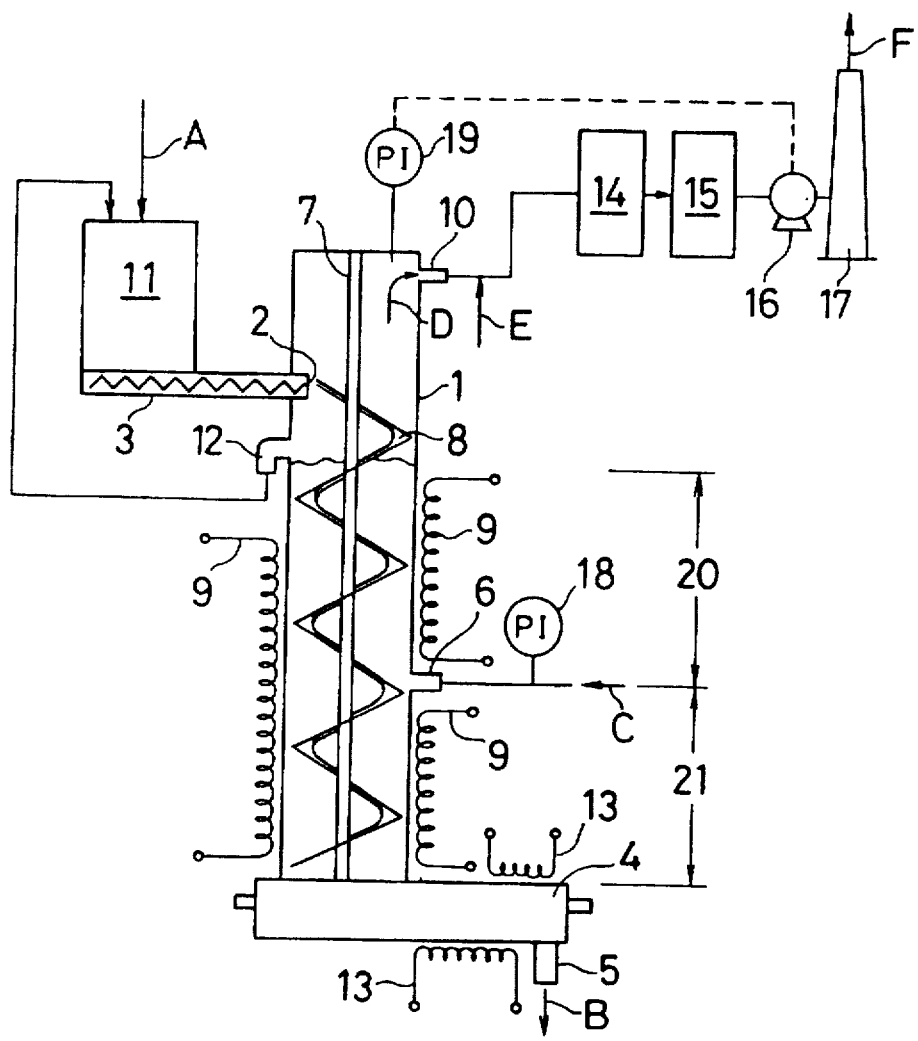
FIG. 1 is a view illustrating a thermal dechlorinating apparatus for collected ash according to an embodiment of the present invention.
Figure 2:
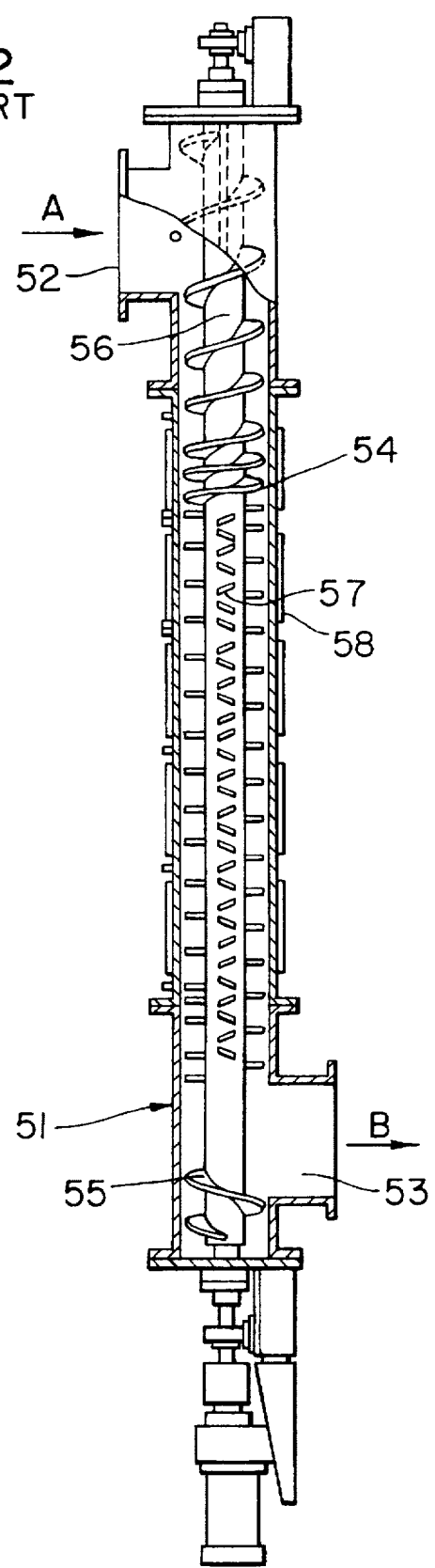
FIG. 2 is a view illustrating the prior art.

FIG. 1 is a view illustrating a thermal dechlorinating apparatus for collected ash according to an embodiment of the present invention. In FIG. 1, the apparatus comprises a vertically elongated cylindrical apparatus body 1, a feed port 2 for collected ash A and an ash discharge port 5 which are provided on the apparatus body 1 and spaced in a vertical direction thereof, a fixed-rate feeder 3 coupled with the ash feed port 2 and an ash ejector 4 having the ash discharge port 5, an inlet port 6 for heated air C which is provided on the portion of the apparatus body 1 between the ash feed port 2 and the ash ejector 4, an exhaust port 10 for an exhaust gas D located above the ash feed port 2 and an overflow port 12 for the collected ash located below the ash feed port 2, a rotary shaft 7 provided along the axial direction of the apparatus body 1, a ribbon screw 8 fixed on the rotary shaft 7, and an electric heater 9 as heating means provided on the outer wall portion of the apparatus body extending from the ash feed port 2 to the ash ejector 4. Reference numeral 11 denotes a storage tank for the collected ash A, reference numeral 13 denotes cooling means for the ash ejector 4, reference numeral 14 denotes a dust collector as an apparatus for treating the exhaust gas D, reference numeral 15 denotes an activated charcoal type absorption column, reference numeral 16 denotes a blower, reference numeral 17 denotes a stack, and reference numerals 18 and 19 denote pressure detectors.

In the construction described above, the collected ash A which has been collected with a bag filter at waste incineration facilities, for example, is fed into the apparatus body 1 through the ash feed port 2 by the fixed-rate feeder 3. Excess collected ash A is removed through the overflow port 12 and returned back to the ash storage tank 11. Accordingly, the charge of collected ash A in the apparatus body is held at a fixed level. The collected ash A contained in the apparatus body 1 is stirred with the ribbon screw 8 and heated by the electric heater 9. At this time, heated air C having a temperature of 250° C., for example, is led in through the air inlet port 6, thereby forming a stirred fluidized layer 20 in the portion of the apparatus body 1 above the air inlet port 6. In the stirred fluidized layer 20, the collected ash A contacts and mixes with the heated air C and is heated to a temperature of 400° C. or higher, whereby combustibles remaining in the collected ash A burn completely. On the other hand, a moving layer 21 is formed in the portion of the apparatus body 1 below the air inlet port 6, which moving layer has a high-temperature, low-oxygen atmosphere where a high temperature of 450° C., for example, is established by the electric heater 9 and by the combustion heat generated by burning the combustibles and where oxygen is consumed. In the moving layer 21, dioxin and other organic chlorine compounds contained in the completely burned collected ash A are decomposed.

Gas including water vapor produced by the decomposition, together with a combustion exhaust gas produced in the stirred fluidized layer 20, flows out as the exhaust gas D from the system through the exhaust gas port 10 located at the upper portion of the apparatus body 1. After being mixed with dilution air E, the exhaust gas D is treated at the subsequent dust collector 14 and activated charcoal type absorption column 15 and is then discharged as treated gas F from the stack 17 into the air. On the other hand, the collected ash A from which combustibles and organic chlorine compounds have been removed by combustion and decomposition, respectively, is cooled by the cooling means 13 and is then discharged as the treated ash B from the system through the discharge port 5 of the ash ejector 4 located at the bottom of the apparatus body 1.

According to the present embodiment, the apparatus body 1 is vertically long, and the apparatus body 1 is provided with the feed port 2 for the collected ash A and the ash ejector 4 having the discharge port 5 for the treated ash B which are provided on the apparatus body and spaced in the vertical direction thereof, with the air inlet port 6 for leading the heated air C into the portion of the apparatus body between the feed port 2 and the discharge port 5, with the screw along the axial direction of the apparatus body, and with the heating means for heating the portion of the apparatus body between the collected ash inlet and outlet, whereby the high-temperature, high-oxygen concentration stirred fluidized layer 20 can be formed in the portion of the apparatus body 1 above the air inlet port 6, and the high-temperature, low-oxygen concentration moving layer can be formed in the portion of the apparatus body 1 below the air inlet port 6. Accordingly, the filling rate and the stirring and mixing effect of the collected ash A improve. Also, the heated air C is prevented from blowing through the stirred fluidized layer, thereby improving an efficiency of the contact mixing of the ash A to be treated and the heated air C and thus achieving complete combustion of combustibles remaining in the collected ash. Further, it is possible to prevent accompanying water taken in the apparatus from condensing. Also, it is possible to efficiently decompose and remove dioxin and other organic chlorine compounds in the lower moving layer 21 having the high-temperature, low-oxygen atmosphere.

According to the present embodiment, not only are organic chlorine compounds in the ash to be treated decomposed and removed, but also remaining combustibles can be burned completely. Accordingly, heat of combustion can be used as a heating source, whereby the apparatus as a whole becomes a compact, multi-purpose treating apparatus. Also, since the collected ash A itself is heated by heat generated by burning the combustibles, the power consumption of the electric heater 9, which is a heating means, can be reduced. Further, as a result of burning the combustibles, a low-oxygen atmosphere is created within the apparatus body, whereby decomposition of chlorine compounds is accelerated without leading an inactive gas into the moving layer.

In the present embodiment, preferably, the ribbon screw 8 can rotate in both regular forward and reverse directions. By rotating the ribbon screw, which has been rotating in the regular direction, in reverse at a predetermined interval of time, internal gas flows more smoothly. Thus, the adhesion or hardening of ash caused by condensation of water vapor and a resultant blocking trouble within the apparatus body can be prevented. If the ribbon screw 8 rotates only in the regular direction, a trouble of rotating of the ash together with the screw is more likely to occur. On the other hand, if the ribbon screw rotates only in the reverse direction, the ash to be treated is too compacted.

In the present embodiment, by adjusting the flow rate of air which is led in through the heated air inlet port 6, the combustive reaction of the combustibles can be controlled, and the temperature within the apparatus body can be adjusted. When heat generated by burning the combustibles cannot be expected due to an excessively small content of the combustibles in the collected ash A, pulverized coal or the like can be added as another combustible.

In the present embodiment, preferably, the ejector 4 is provided with a cooling means capable of cooling the treated ash B to be discharged from the system to a temperature of 200° C. or less, for example. This prevents chlorine compounds from being re-synthesized in the treated ash B. A screw conveyor with a water-cooled jacket, for example, is used as the ash ejector.

In the present embodiment, the level of a filling layer of the collected ash A in the apparatus body can be detected with the pressure detector 18 located at the air inlet port 6. Also, by mixing the dilution air E with the exhaust gas D discharged from the exhaust port 10, subsequent exhaust gas treatment can be facilitated.

Specific embodiments of the present invention will now be described.

EMBODIMENT 1

The apparatus of FIG. 1 was used to treat ash (BF ash), which had been collected by a bag filter, by heating under the following conditions. The ash to be treated was charged at a rate of 50 kg/hr; the residence time of the ash within the apparatus was 30 min; the ribbon screw 8 usually rotated in the regular direction and underwent every 10 minutes an alternating reverse operation where 5 cycles of regular and reverse rotations were performed, each cycle being composed of rotation in the regular direction for 5 seconds and rotation in the reverse direction for 5 seconds; the electric heater 9 was set to a heating temperature of 600° C.; and air heated to a temperature of 250° C. was led in through the air inlet port 6 at a rate of 0.13 Nm3/hr per kg of the ash to be treated. As a result, dioxins (DXNs), which are harmful chlorine compounds, were removed with a removal percentage of 91.9%.

(EMBODIMENTS 2–7)

Conditions of treatment and the removal percentage of dioxins for Embodiments 2 through 7, together with those for Embodiment 1, are shown in Tables 1 and 2.

TABLE 1

| Conditions of treatment | Embodiments | | | | | | |
|---|---|---|---|---|---|---|---|
| | 1 | 2 | 3 | 4 | 5 | 6 | 7 |
| Conditions: | | | | | | | |
| Ash type | BF | BF | BF | BF | BF | BF | BF |
| Addition of activated charcoal in BF (3 to 5%) | NO | NO | YES | YES | YES | YES | YES |
| Heated air flow rate (Nm³/Hr) (per ash kg) | 0.13 | 0.25 | 0.13 | 0.13 | 0.13 | 0.18 | 0.18 |
| Externally heating heater temp. (°C.) | 600 | 600 | 600 | 500 | 500 | 500 | 500 |
| Heated air temp (°C.) | 250 | 270 | 255 | 205 | 205 | 260 | 260 |
| Measured temperature: | | | | | | | |
| Casing (°C.) | 435 | 415 | 475 | 385 | 420 | 405 | 405 |
| Ash at outlet (°C.) | 491 | 495 | 525 | 510 | 520 | 495 | 495 |
| Exhaust gas at upper portion (°C.) | 170 | 120 | 350 | 150 | 160 | 300 | 300 |

Note:
In Embodiments 1–7, the ash was charged at a rate of 50 kg/hr, the residence time of the ash within the apparatus was 30 min, and the screw usually rotated in the regular direction and underwent every 10 minutes an alternating reverse operation in which 5 cycles of regular forward and reverse rotations were performed, each cycle being composed of rotation in the regular direction for 5 seconds and rotation in the reverse direction for 5 seconds.

TABLE 2

| Results of analysis of DXNs (ng/g) | Embodiments | | | | | | |
|---|---|---|---|---|---|---|---|
| | 1 | 2 | 3 | 4 | 5 | 6 | 7 |
| | Ash to be treated: | | | | | | |
| [PCDDs] | | | | | | | |
| 4CDD | 3.5 | 4.8 | 51.0 | 240.0 | 240.0 | 150.0 | 150.0 |
| 5CDD | 11.0 | 10.9 | 86.0 | 440.0 | 440.0 | 230.0 | 230.0 |

TABLE 2-continued

| Results of analysis | Embodiments | | | | | | |
|---|---|---|---|---|---|---|---|
| of DXNs (ng/g) | 1 | 2 | 3 | 4 | 5 | 6 | 7 |
| 6CDD | 24.0 | 5.1 | 27.0 | 720.0 | 720.0 | 360.0 | 360.0 |
| 7CDD | 27.0 | 9.1 | 25.0 | 260.0 | 260.0 | 130.0 | 130.0 |
| 8CDD | 21.0 | 11.0 | 17.0 | 170.0 | 170.0 | 77.0 | 77.0 |
| Total PCCDs | 86.5 | 40.9 | 206.0 | 1830.0 | 1830.0 | 947.0 | 947.0 |
| [PCFDs] | | | | | | | |
| 4CDF | 3.4 | 3.0 | 5.0 | 14.0 | 14.0 | 14.0 | 14.0 |
| 5CFD | 6.4 | 5.9 | 6.4 | 22.0 | 22.0 | 18.0 | 18.0 |
| 6CFD | 10.0 | 2.9 | 2.9 | 29.0 | 29.0 | 19.0 | 19.0 |
| 7CFD | 13.0 | 3.1 | 3.0 | 27.0 | 27.0 | 16.0 | 16.0 |
| 8CFD | 7.9 | 5.1 | 2.0 | 14.0 | 14.0 | 6.8 | 6.8 |
| Total PCDFs | 40.7 | 20.0 | 19.3 | 106.0 | 106.0 | 73.8 | 73.8 |
| PCDD + PCDF | 127.2 | 60.9 | 225.3 | 1936.0 | 1936.0 | 1020.8 | 1020.8 |
| | | | Treated ash: | | | | |
| [PCDDs] | | | | | | | |
| 4CDD | 0.50 | 0.16 | 0.05 | 2.30 | 0.14 | 0.36 | 0.16 |
| 5CDD | 0.60 | 0.18 | 0.05 | 2.10 | 0.27 | 0.38 | 0.42 |
| 6CDD | 1.30 | 0.01 | 0.04 | 1.70 | 0.36 | 0.40 | 0.24 |
| 7CDD | 0.70 | 0.01 | 0.09 | 0.53 | 0.12 | 0.36 | 0.12 |
| 8CDD | 0.60 | 0.01 | 0.07 | 0.19 | 0.06 | 0.25 | 0.05 |
| Total PCDDs | 3.70 | 0.37 | 0.30 | 6.82 | 0.95 | 1.75 | 0.99 |
| [PCDFs] | | | | | | | |
| 4CDF | 1.30 | 0.31 | 0.12 | 0.69 | 0.12 | 0.54 | 0.38 |
| 5CDF | 1.70 | 0.50 | 0.32 | 0.45 | 0.18 | 0.73 | 0.32 |
| 6CDF | 1.70 | 0.05 | 0.10 | 0.25 | 0.08 | 0.54 | 0.16 |
| 7CDF | 1.30 | 0.03 | 0.09 | 0.12 | 0.04 | 0.33 | 0.10 |
| 8CDF | 0.60 | 0.03 | 0.13 | 0.04 | 0.03 | 0.15 | 0.03 |
| Total PCDFs | 6.60 | 0.92 | 0.76 | 1.55 | 0.45 | 2.29 | 0.99 |
| PCDD + PCDF | 10.30 | 1.29 | 1.06 | 8.37 | 1.40 | 4.04 | 1.98 |
| TEQ value | 0.10 | 0.013 | 0.011 | 0.084 | 0.014 | 0.040 | 0.02 |
| DXNs removal percentage (%) | 91.9 | 97.9 | 99.5 | 99.6 | 99.9 | 99.6 | 99.8 |

As seen from Table 2, dioxins in the ash to be treated were efficiently decomposed and removed in any of the embodiments. The removal percentage was 90% or higher in the embodiments. Also, in the third to seventh embodiments where the ash to be treated was collected ash mixed with activated charcoal, the dioxin removal percentage was 99% or higher.

The present invention provides a thermal dechlorinating apparatus and method capable of efficiently decomposing and removing harmful chlorine compounds in ash which is collected at a treating apparatus or the like for treating an exhaust gas released from waste incineration facilities for burning municipal waste and industrial waste.

We claim:

1. A thermal dechlorinating apparatus for collected ash, comprising a vertically elongated cylindrical apparatus body, a collected ash inlet and a collected ash outlet which are provided on the apparatus body and spaced in a vertical direction thereof, an inlet port for heated air provided on a portion of the apparatus body between the collected ash inlet and the collected ash outlet, an exhaust gas outlet provided on a portion of the apparatus body above the collected ash inlet, a rotary shaft provided along an axial direction of the apparatus body, a screw provided on the rotary shaft, and heating means provided on a portion of the apparatus body between the collected ash inlet and the collected ash outlet, and wherein the screw is a ribbon screw which gives an upward component force under regular rotation and which gives a downward component force under reverse rotation.

2. A thermal dechlorinating apparatus for collected ash according to claim 1, wherein the heating means is such that heating medium flows through a hollow rotary shaft.

3. A thermal dechlorinating apparatus for collected ash according to claim 1, wherein cooling means for cooling ash is provided at the collected ash outlet.

4. A thermal dechlorinating apparatus for collected ash comprising a vertically elongated cylindrical apparatus body, a collected ash inlet and a collected ash outlet which are provided on the apparatus body and spaced in a vertical direction thereof, an inlet port for heated air provided on a portion of the apparatus body between the collected ash inlet and the collected ash outlet, an exhaust gas outlet provided on a portion of the apparatus body above the collected ash inlet, a rotary shaft provided along an axial direction of the apparatus body, a screw provided on the rotary shaft, and heating means provided on a portion of the apparatus body between the collected ash inlet and the collected ash outlet, the heating means being such that heating medium flows through a hollow rotary shaft.

5. A thermal dechlorinating apparatus for collected ash according to claim 4, wherein cooling means for cooling ash is provided at the collected ash outlet.

6. A thermal dechlorinating method for collected ash, wherein the collected ash is charged into a vertically elongated cylindrical apparatus body through an inlet located at an upper portion of the apparatus body, the collected ash being stirred and mixed with a rotary screw provided along an axial direction of the apparatus body and heated by heating means provided on at least one of the apparatus body and the rotary screw to decompose and remove chlorine compounds contained in the ash, the treated collected ash being ejected from a lower portion of the apparatus body, gas produced by the decomposition being released from an exhaust port provided on a portion of the apparatus body above the collected ash inlet, wherein heated air is led into a portion of the apparatus body between the collected ash inlet and a collected ash outlet, a stirred fluidized layer being formed in a portion of the apparatus body above the portion for leading the heated air in and a moving layer being formed in a portion of the apparatus body below the portion for leading the heated air in, combustibles in the collected ash being burned in the stirred fluidized layer, the combustion heat generated by burning the combustibles being used to perform a partial or entire decomposition and removal of the chlorine compounds.

7. A thermal dechlorinating method for collected ash according to claim 6, wherein the rotary screw is a ribbon screw which gives an upward component force under regular rotation and which gives a downward component force under reverse rotation, and wherein the ribbon screw is rotated in reverse as needed.

8. A thermal dechlorinating method for collected ash according to claim 7, wherein powdered fuel in an amount of 0.1 to 10 weight percent is added to collected ash to be treated, and then the collected ash is charged into the apparatus body through the collected ash inlet.

9. A thermal dechlorinating method for collected ash according to claim 7, wherein the collected ash from which chlorine compounds have been removed by decomposition is cooled and then ejected from the collected ash outlet.

10. A thermal dechlorinating method for collected ash according to claim 6, wherein powdered fuel in an amount of 0.1 to 10 weight percent is added to collected ash to be treated, and then the collected ash is charged into the apparatus body through the collected ash inlet.

11. A thermal dechlorinating method for collected ash according to claim 10, wherein activated charcoal or pulverized coal is used as the powdered fuel.

12. A thermal dechlorinating method for collected ash according to claim 10, wherein the collected ash from which chlorine compounds have been removed by decomposition is cooled and then ejected from the collected ash outlet.

13. A thermal dechlorinating method for collected ash according to claim 6, wherein the collected ash from which chlorine compounds have been removed by decomposition is cooled and then ejected from the collected ash outlet.

* * * * *